United States Patent
Shinosky, Jr.

(10) Patent No.: US 9,415,984 B1
(45) Date of Patent: Aug. 16, 2016

(54) METHOD AND APPARATUS FOR PALLET TRANSPORT WITH FORKLIFT CARTS

(76) Inventor: Leonard W. Shinosky, Jr., Nottingham, MD (US)

(*) Notice: Subject to any disclaimer, the term of this patent is extended or adjusted under 35 U.S.C. 154(b) by 973 days.

(21) Appl. No.: 13/472,129

(22) Filed: May 15, 2012

(51) Int. Cl.
*B66F 9/12* (2006.01)
*B65G 1/04* (2006.01)
*B66F 9/06* (2006.01)
*B62B 3/04* (2006.01)

(52) U.S. Cl.
CPC ... *B66F 9/12* (2013.01); *B65G 1/04* (2013.01); *B66F 9/06* (2013.01)

(58) Field of Classification Search
USPC .......................................... 414/608
See application file for complete search history.

(56) References Cited

U.S. PATENT DOCUMENTS

| | | | |
|---|---|---|---|
| 1,854,741 A | 4/1932 | Jackson | |
| 2,572,240 A | 10/1951 | Black | |
| 1,675,139 A | 4/1954 | Mercier et al. | |
| 2,803,363 A * | 8/1957 | Hutchinson | 414/608 |
| 2,968,491 A * | 1/1961 | Wilson | 280/47.34 |
| 3,157,423 A * | 11/1964 | Brie, Sr. | 294/67.1 |
| 3,190,473 A * | 6/1965 | Loef | 414/541 |
| 3,423,101 A | 1/1969 | Boeye | |
| 3,727,778 A * | 4/1973 | Hollenbach | 414/541 |
| 4,150,840 A | 4/1979 | Banerjea et al. | |
| 4,239,446 A * | 12/1980 | Vucinic | 414/785 |
| 4,492,504 A * | 1/1985 | Hainsworth | 414/273 |
| 4,538,953 A | 9/1985 | Abramson, Jr. | |
| 4,678,390 A * | 7/1987 | Bonneton et al. | 414/282 |
| 4,884,936 A | 12/1989 | Kawada | |
| 5,161,933 A | 11/1992 | Stauber | |
| 5,211,523 A * | 5/1993 | Andrada Galan et al. | 414/282 |
| 5,236,299 A | 8/1993 | Oskam | |
| 5,340,268 A * | 8/1994 | Dowty | 414/622 |
| 5,393,188 A * | 2/1995 | Scott et al. | 414/276 |
| 5,476,180 A * | 12/1995 | Konstant | 211/151 |
| 5,692,872 A | 12/1997 | Raben | |
| 6,015,255 A | 1/2000 | Vander Meer | |
| 6,135,701 A | 10/2000 | Galloway, Sr. | |
| 2003/0235489 A1* | 12/2003 | Hoff | 414/607 |
| 2004/0033127 A1 | 2/2004 | Roseman et al. | |
| 2008/0044270 A1 | 2/2008 | Mead | |
| 2008/0181760 A1 | 7/2008 | Frahm et al. | |

\* cited by examiner

*Primary Examiner* — James Keenan
(74) *Attorney, Agent, or Firm* — John H. Pearson, Jr., Esq.; Walter F. Dawson, Esq.; Pearson & Pearson, LLC

(57) ABSTRACT

A cart for improving the efficiency of a forklift as it performs the task of removing pallets of merchandise from a trailer, transporting them, one or two pallets at-a-time, to storage racks, and placing them in their assigned storage slots at various levels. Likewise, the forklift pulls the pallets from the storage racks above the floor of the warehouse loads the pallets on a cart and transports them, again one or two pallets at a time, to the loading dock area where they are loaded onto trailers.

A transport system includes a specifically equipped cart and a means to secure and unsecure the forklift to the cart, and a method for employing the cart to be used in conjunction with the forklift so that the forklift can transport two pallets instead of just one as it travels between the loading dock area and locations in the rows of storage racks.

4 Claims, 16 Drawing Sheets

METHOD AND APPARATUS FOR PALLET TRANSPORT WITH FORKLIFT CARTS

This application is a Continuation-in-Part of prior application Ser. No. 12/258,004, filed Oct. 24, 2008, now abandoned which is herein incorporated by reference.

BACKGROUND OF THE INVENTION

1. Field of the Invention

In a warehousing situation there is an on-going task of transferring pallets of merchandise between the inside of a trailer parked at a loading dock and various locations at various levels in rows of multi-tiered storage racks. Whether loading trailers or unloading trailers, the endpoints of the process remain the same: trailers on one end and multilevel storage rack locations on the other end. The forklift spends a significant percentage of its operating time traveling between these two areas, carrying one pallet at a time as it does so. This is especially so in very large warehouses.

If a way could be found to inexpensively and quickly and easily enable the forklift to transport two pallets at a time instead of one there would be a significant increase in the forklift's efficiency, which is what this invention accomplishes.

There are immediate benefits because handling time is reduced on a trailer-by-trailer basis, and there are longer term benefits due from the cumulative reduction of labor costs and usage time and mileage accrued on the forklift. Other advantages include statistical reduction in collision type accidents because the number of back and forth trips is reduced for an equivalent number of pallets, and there is a reduction in fuel use and/or battery use.

The novelty of this invention is that it introduces into a warehouse environment a comparatively inexpensive and simple way to improve the horizontal transport efficiency of a forklift in an environment where previously the forklift has been provided with multiple pallet transport capacity by installing expensive attachment equipment which typically requires purchasing a bigger, more expensive forklift to handle the additional pallet weight provided for by the attachment device.

2. Description of Related Art

The concept of transporting more than one pallet at a time by a forklift per-se does exist to a limited extent. The mast of a forklift is equipped with a support frame that is wide enough to hold two sets of forks. The pairs of forks are positioned symmetrically to the left and to the right of the mast. The operator can insert the two sets of forks simultaneously into two pallets side by side, lift them, transport them to a desired location, and place them simultaneously at their new location. However; there are significant limitations. First of all, the pallets of merchandise must be of the same weight otherwise there would be a left/right balance issue. Secondly the combined weight of the pallets must be less than the lifting/tipping capacity of the forklift. Because of these limitations the application of this type of device is restricted to situations where the pallet loads are homogenous and very light unless a forklift with greater lifting capacity is used. A typical example is a warehouse which stores pallets of unfilled soda cans before they are shipped to the bottling plant. Note that this device MUST lift two pallets at a time if they are side by side. It can't select a single pallet from a fully loaded rack. It has to select two pallets because the twin fork assembly is fixed. Both sets of forks are raised and lowered at the same time.

There is a second type of device which is similar to the first device but has somewhat more versatility. Imagine a typical set of forklift blades (two blades). Then imagine slicing each of the forklift blades along its length. Set up linkage and hydraulics that joins the left hand slices of each blade together, and linkage that does the same for the right hand slices. Then provide hydraulics and control devices that move each pair of linked slices independently. Using the controls the operator can move each pair of half wide blades to set up a twin set of fork blades and consequently be able to lift two pallets at a time as with the first device. However this device has more handling versatility because the operator can move the sets of half blades together to form a single set of blades, extract a single pallet from the storage racks, transport it to another rack location and place it on the floor. A second pallet can be extracted from the racks and placed on the floor beside the first pallet. The operator can than re-position the sets of half fork blades to form two sets of blades and then use them to pick up both pallets simultaneously. If the operator starts with two pallets and wants to place them in different locations he simply re-configures the forks in the appropriate manner and proceeds. Again all of the weight and balance restrictions of the first type of device still apply. These devices are generically termed double pallet handlers or multiple pallet handlers.

Although not a forklift per-se, there is another example of a piece of material handling equipment transporting two pallets at a time. This piece of equipment is a pallet jack which has forks that are twice as long as those of a standard pallet jack. Two pallets are positioned one behind the other. The pallet jack with the extra long forks is inserted into the first pallet. As the jack is pushed forward the forks go into the second pallet as well. When the operator raises the jack both pallets are lifted, and can be transported as the operator then moves the jack.

Another area where prior art exists is the device which is used to couple/interface the forklift to the cart. U.S. Pat. No. 4,884,936, issued Dec. 5, 1989 to Kawada, shows a pallet jack of reduced dimensions with respect to a standard pallet jack that has been equipped with a flange on the vertical part of the body of the jack. The pallet jack, in its lowered condition, is driven underneath the cart with the vertical part of the jack body against the bottom edge of the cart the edge of which has also been equipped with a flange. The jack is then raised and the flange on the bottom edge of the cart is secured between the flange on the pallet jack and the vertical part of the body of the jack. This method of engagement is nearly identical to the method that will be described later where the horizontal blades of a forklift are equipped with vertical projections and the fork blades are driven under a cart and the blades are the raised thereby engaging with a plate beneath the edge of the cart. The physical device in the Kawada patent is basically a customized pallet jack. It is used to interface with a 4-wheel cart (all castors) that has a frame structure above it for holding boxes of merchandise. Note that in the Kawada invention the entire customized pallet jack is considered to be the invention.

Another example in which a pallet jack is equipped to interface with a cart is shown in a U.S. Patent Application Publication No. 2008/0181760 by Frahm et al. In this invention a device is mounted between the straddle forks of the pallet jack right at the front tips of the forks. Its method of engaging with a cart Is similar to that used by Kawada with two major differences. In the Kawada application the dimensions of the Kawada device are made narrow enough to allow the outside edge of the forks to go between the wheels on the end of the cart and consequently go under the cart. In Frahm/Mehle a pallet jack of standard width is used and the forks cannot go underneath the cart from the end. The second factor is that the Frahm/Mehle device is equipped with swivels and slide adjustments so that it can interface with the cart even on an uneven surface. The Kawada device has no such feature. The invention of Frahm/Mehle is considered to be an attachment only, not an entire custom powered pallet jack as in Kawada.

Both the Kawada device and the Frahm/Mehle device involve pallet jacks only. A pallet jack can only lift a load several inches from the floor surface and must deposit that load back on the floor surface. A forklift has extended vertical lift ability and can place a load or retrieve a load from a level well above the floor level upon which it rests. U.S. Pat. No. 5,236,299 by Oskam describes a device to be connected to a trailer (a cart with wheels on one end and a support stand on the other end) where the device has two offset parallel metal bars. The fork blades of a forklift are inserted in between the bars which are at the support stand end of the trailer and then the forks are raised slightly thereby lifting the support stand off the ground. The offset parallel bars trap the fork blades and the binding friction between the bars and the fork blades allows the forklift to move and turn with the trailer.

It is noted that the specific means to connect the cart to the forklift is not an essential aspect of the invention. The fact that a means of some kind be used is necessary but the specific way is optional.

In the context of prior art, if it was desired to provide a forklift with the ability to transport multiple pallets at a time, the forklift had to be fitted with an expensive hydraulic/mechanical device. There was the high cost of the device itself. Then there was the cost of installing the device on the forklift. Then depending on the size of the forklift already in use there was the cost of upgrading to a heavier/stronger forklift to handle the added lifting capacity that the multiple pallet device provided. The present invention enables a forklift to transport two pallets at a time with minimum or no modifications to the forklift and a much less expensive cart.

SUMMARY OF THE INVENTION

Accordingly, it is therefore an object of this invention to provide a forklift that is able to quickly and easily attach itself and detach itself from the cart. Various means are available to accomplish this. Most of them require the forklift to be equipped with special fittings that are mounted on the forks themselves but do not interfere with the forklift's standard task of handling pallets. Also the cart must be equipped with devices that render it compatible with the devices on the forklift.

It is another object of this invention to provide a cart itself that is mechanically simple and relatively inexpensive, and also quick and easy to use by the forklift operator. The combined weight of the pallets carried could exceed the lifting/tipping capacity of the forklift, and it can transport the two pallets at the same speed that it transported one pallet, or a stack of pallets. This results in a significant reduction in both travel distance and travel time as the forklift goes about its task of loading and unloading trailers, connecting to the cart and disconnecting from it as the situation dictates.

These and other objects are accomplished by transporting pallets using a forklift from a first location to a second location and a third location, each second location and third location having a plurality of storage levels comprising the steps of (a) extracting with the forklift a first pallet of merchandise from the first location and placing the first pallet on a cart having a surface area for holding at least two adjacent pallets, (b) extracting with the forklift a second pallet of merchandise from the first location and placing the second pallet on the cart adjacent to the first pallet, (c) coupling the forklift to the cart, (d) driving the forklift to the second location and decoupling the forklift from the cart, (e) removing one of the pallets from the cart and placing the pallet in the second location at a predetermined storage level, (f) re-coupling the forklift to the cart, (g) driving the forklift to a third location and decoupling the forklift from the cart, and (h) removing the second pallet from the cart and placing the pallet in the third storage location at a predetermined storage level. The method further comprises the step of repeating steps (a) to (h) until all pallets are transported to a storage location.

The objects are further accomplished by transporting pallets of merchandise using a forklift from storage racks where the pallets are stored on the racks at a plurality of levels to a predetermined location comprising the steps of (a) coupling the forklift to an empty cart having a surface area for holding at least two adjacent pallets and driving to a first location of a first pallet, (b) decoupling the forklift from the cart, (c) removing with the forklift the first pallet from a first storage rack and placing the first pallet on the cart, (d) re-coupling the forklift to the cart and driving to a second location of a second pallet to be loaded on the cart, (e) decoupling the forklift from the cart, (f) removing the second pallet from a second storage rack at the second location and placing the second pallet on the cart, (g) re-coupling the forklift to the cart and driving to the predetermined location, (h) decoupling the forklift from the cart, and (i) removing the first pallet and second pallet from the cart and placing the first pallet and the second pallet at the predetermined location. The method further comprises the step of repeating steps (a) to (i) until all pallets are transported to at least one predetermined location.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from reading of the following detailed description in conjunction with the accompanying drawings in which like reference numerals refer to like parts, and in which:

DESCRIPTION OF ILLUSTRATIVE EMBODIMENTS

Figure 1A:
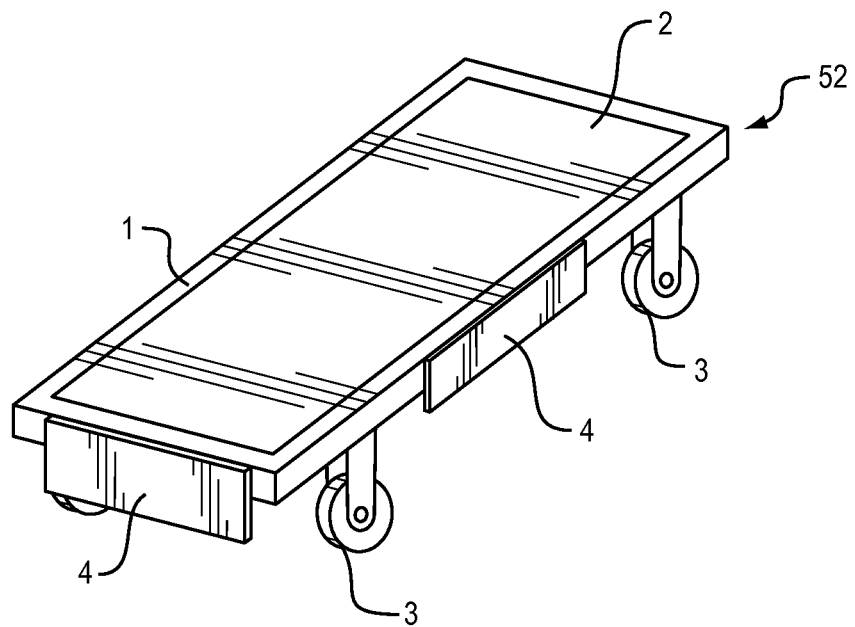
FIG. 1A shows a perspective drawing of a basic cart having coupling plates on both the sides and the ends of the cart.

There are four aspects to be considered in the present invention:
1) The system concept itself: that of enabling a forklift 50 to transport two pallets 64, 66 at a time by connecting to and disconnecting from a cart 52 and how to specifically employ the cart 52 in this process;
2) The carts;
3) The specific equipment and means of coupling/interfacing between for example, the cart 52 and forklift 50; and
4) Cart design and methods for speeding up of placing the pallets on the cart and removing them from the cart.

The system concept or method involves the following steps to be performed by the forklift 50 in the unloading of trailers or merchandise on pallets at a specific location:

1) Place the cart 52 in the vicinity of the trailer to be unloaded;
2) Extract a pallet of merchandise from the trailer and place it on the cart 52;
3) Extract a second pallet of merchandise from the trailer and place it on the cart 52;
4) Couple the forklift to the cart 52 and drive to the storage location of the first pallet to be removed from the cart 52 and placed in the storage racks;
5) Decouple the forklift 50 from the cart 52;
6) Remove the desired pallet from the cart 52 and place it on the storage racks;
7) Re-couple the forklift 50 with the cart 52 and drive to the next location where the remaining pallet is to be placed on the storage racks;
8) Decouple from the cart 52 and place the second pallet on the storage racks;
9) Re-couple with the now empty cart 52 and drive back to the loading dock area; and
10) Repeat the above steps until the trailer is unloaded.

The loading process simply starts with pulling pallets of merchandise from storage racks and getting them loaded into the trailer or transported to a specific location:

1) Couple the forklift 50 to an empty cart 52 and drive to the location of the first pallet that is to be pulled from the warehouse racks;
2) Decouple the forklift 50 from the cart 52;
3) Remove the $1^{st}$ pallet from the storage racks and place it on the cart 52;
4) Re-couple the forklift 50 to the cart 52 and drive to the storage location of the next pallet to be loaded on the cart;
5) Decouple the forklift 50 from the cart 52;
6) Remove the $2^{nd}$ pallet of merchandise from the storage racks and place it on the cart 52;
7) Re-couple the forklift 50 to the cart 52 and drive to the loading dock area;
8) Decouple the forklift 50 from the cart 52;
9) Unload the pallets from the cart 52 and place them in the trailer; and
10) Repeat the above steps until the trailer is loaded.

When the phrase "drive to the location . . . " or "drive to the next location . . . " is used it is implied in the use of that phrase that the forklift operator is first driving to said location and then when there is stopping the forklift i.e. coming to a complete stop, at least momentarily when doing so is essential to performing the task at hand. Actually there are certain cart/trailer designs that would allow the operator to de-couple from the cart without having to come to a complete stop but that is a function of the specific type of cart being used and at the discretion of the operator. Similarly when the phrases "couple to the cart", "re-couple to the cart", or "de-couple from the cart" are used it is understood that the operator is again taking all of the necessary actions to properly accomplish the action according to the specific cart or trailer being used.

There are several cart embodiments described herein which have advantages depending on the operating environment in a storage facility.

Note that if we just wanted to move pallets of merchandise that were sitting on the floor to another location on the floor, we wouldn't have to use a forklift and a cart according to the present invention to transport the pallets two at-a-time. We could simply use a pallet jack with double-long forks.

This highlights a specific aspect in the context of use for this invention. It specifies that an integral part of the task that the forklift 50 (as a single piece of powered mechanized equipment) is performing is the placing of pallets of merchandise at levels in storage racks above the floor level of the warehouse in the unloading process, after transporting them from trailers parked at the loading dock and retrieving them from levels above the floor level of the warehouse in the loading process and transporting them to trailers parked at the loading dock. Note that statistically some of the pallets may have specified locations on the ground floor but this is a small percentage compared to the pallets that are placed above the ground floor. Furthermore the occurrence of this is irregular and would not warrant switching to a pallet jack temporarily.

The Cart

Figure 1B:
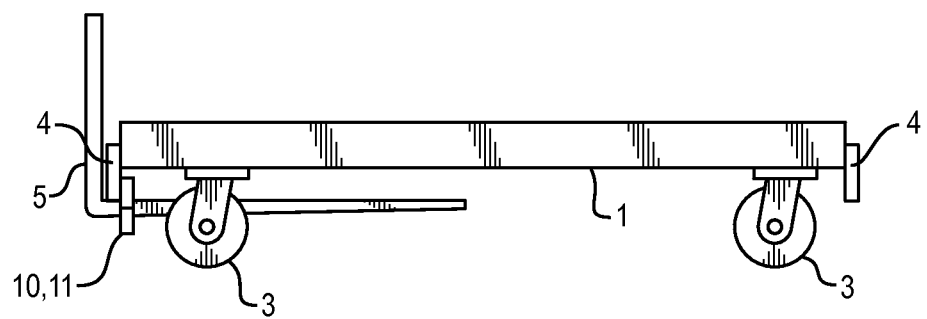
FIG. 1B shows a side view of the cart with a fork blade securing the coupling plate via the horizontally mounted fitting on the fork blade.

Referring to FIG. 1A and FIG. 1B, the cart 50 has a frame 1, a support area 2 and four wheels 3, all of which are of the swivel castor type. Since it is intended to carry two standard pallets of merchandise, it is somewhat longer than 8 ft. and is 4 ft. wide to properly accommodate two 48" by 44" pallets. The cart surface is a flatbed design and relatively low to the ground so that a forklift can easily place pallets from either end or from either side. Note that the support area 2 although shown as a solid surface in FIG. 1A could be a grid or just a frame as long as it effectively supported the pallet and allowed easy use for placement and removal of pallets by the forklift. Shown on the side and the end of the cart is a coupling plate 4. The coupling plate is the specific fitting that is mounted on the cart that the forklift uses to attach itself to the cart.

For practical and safety reasons the cart can readily be equipped with a braking system. Such systems are commonplace and could readily be incorporated.

Figure 3:
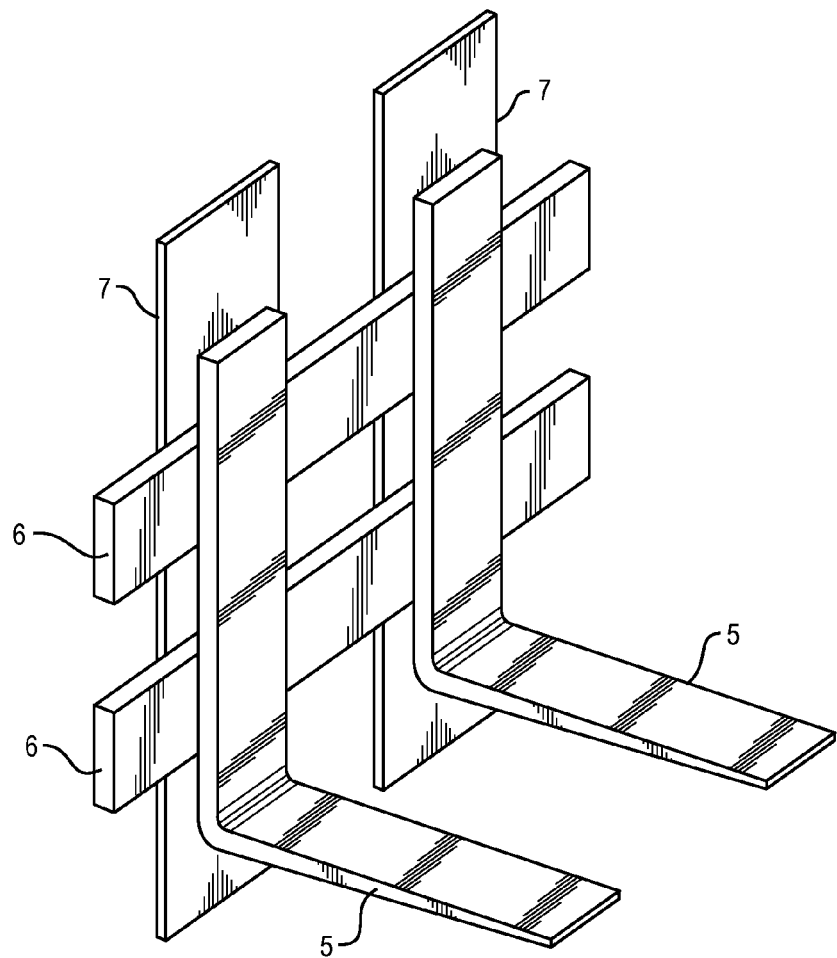
FIG. 3 shows a perspective drawing of a pair of forklift blades with the horizontal pieces of the support frame shown behind the vertical portion of the forks.
Figure 4:
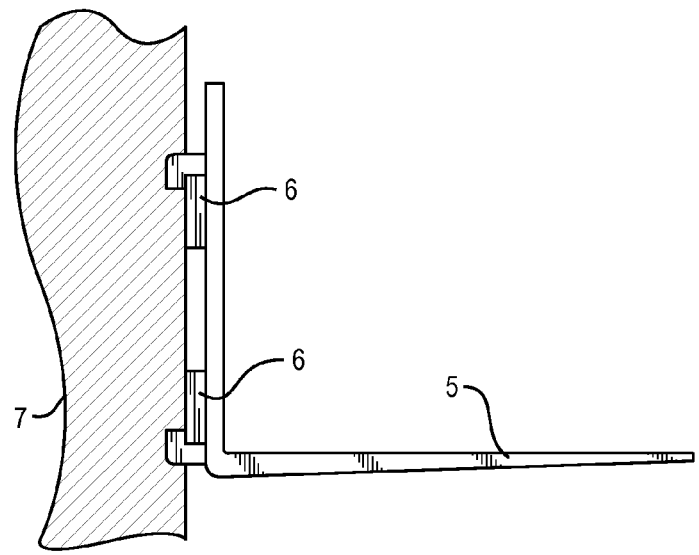
FIG. 4 shows a side view of a pair of forklift blades with the support frame behind them and the mast of the forklift.
Figure 7:
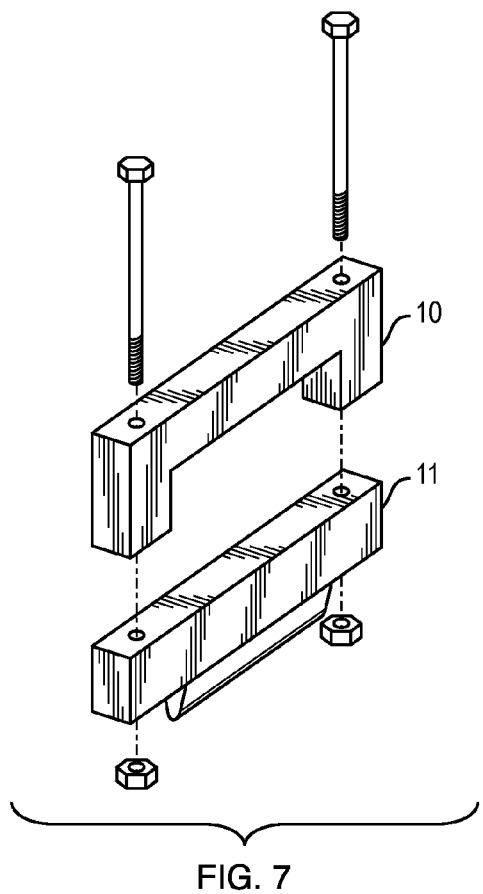
FIG. 7 is an exploded perspective view of a fitting that is designed to be mounted on the horizontal part of the fork.
Figure 9:
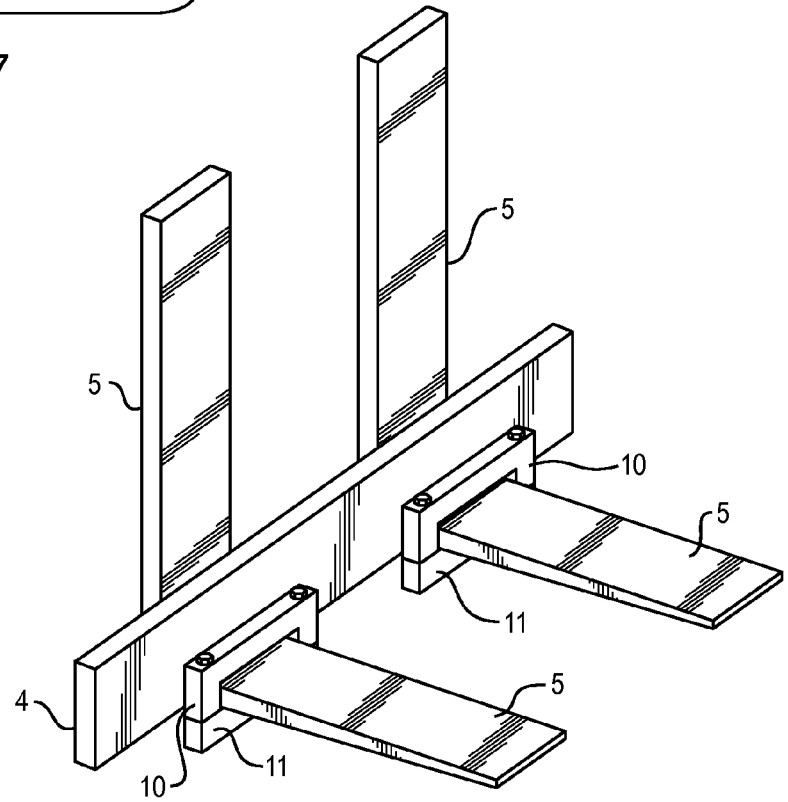
FIG. 9 is a perspective drawing of a set of forklift blades that are fitted with horizontally mounted fittings with a coupling plate shown secured by the fittings.
Figure 10:
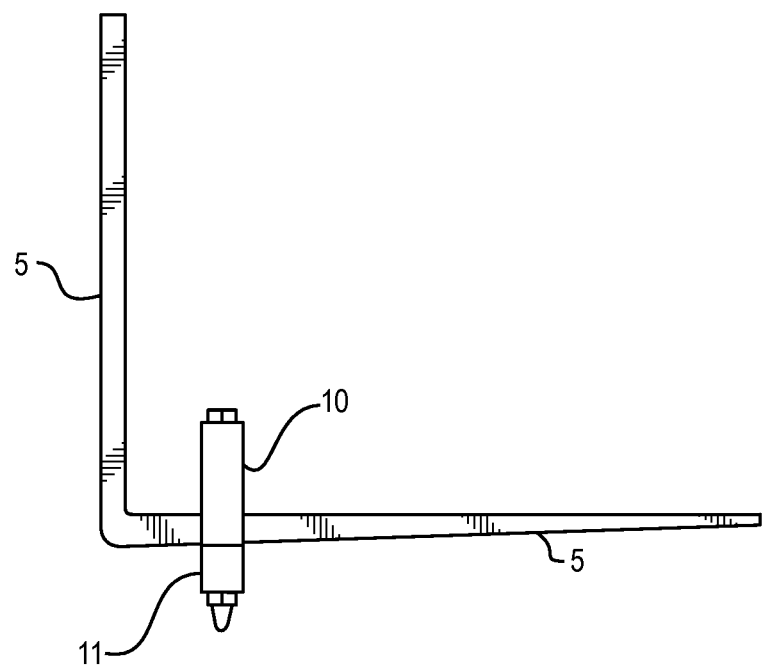
FIG. 10 shows a side view of a forklift blade that has been fitted with the horizontally mounted fitting shown in FIG. 7

Referring to FIG. 3, FIG. 4, FIG. 7 and FIG. 8, a variety of useful and workable means of coupling and decoupling the forklift 50 to a cart exist. The two forks 5 on a forklift 50 are each basically an L-shaped piece of metal with a tapered horizontal portion for inserting into the space between the top and bottom parts of a pallet and a vertical portion which is secured to a support frame which itself is secured to the mast of the forklift. A set of such forks 5 is shown in FIG. 3. This is a perspective view and shows the forks 5, and the support frame 6. FIG. 4 shows a side view of the same equipment but includes the mast 7. Consider fastening a piece of metal to the top surface of the horizontal part of the fork just ½ inch or so from where the 90 deg. bend is in the L shaped fork. That places it just ½ inch or so from the vertical part of the fork itself. Do this for both forks 5. A drawing of such a piece of metal is shown in FIG. 7. It has a top piece 10 and a bottom piece 11. A side view of the same fitting by itself and with the top and bottom pieces bolted together is shown in FIG. 10. A drawing of a set of forks that has been thusly equipped is shown in FIG. 9. Mount a vertical plate on the end of the cart. Make the horizontal dimension of the plate nearly as wide as the end of the cart and make the vertical dimension of the plate several inches greater than the thickness of the edge of the cart. Position the plate vertically so that its top edge is even with the edge of the cart. Such a plate 4 is shown in FIG. 1A. This will make the bottom edge of the plate several inches lower than the bottom edge of the cart. Drive the forklift 50 with the forks 5 lowered so the blades of the forks 5 are underneath the cart and the vertical portion of the forks is touching the plate. Raise the forks enough to contact the bottom edge of the plate with the horizontal surface of the forks 5. The bottom edge of the plate is now secured between the vertical surface of the fork and the vertical projection that has been mounted on the top horizontal surface of the fork. The forklift operator can now drive around with the cart securely affixed to the forklift 50. A set of fork blades holding a coupling plate as just described is shown in FIG. 9. To disengage from the cart 52 simply lower the forks 5 and drive the forklift 50 in reverse so as to withdraw the forks 5 from underneath the cart.

Figure 5:
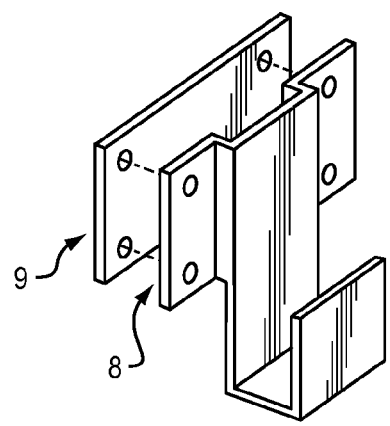
FIG. 5 is a perspective view of a 2 piece vertically mounted fitting designed to be secured to the vertical part of the fork.
Figure 6:
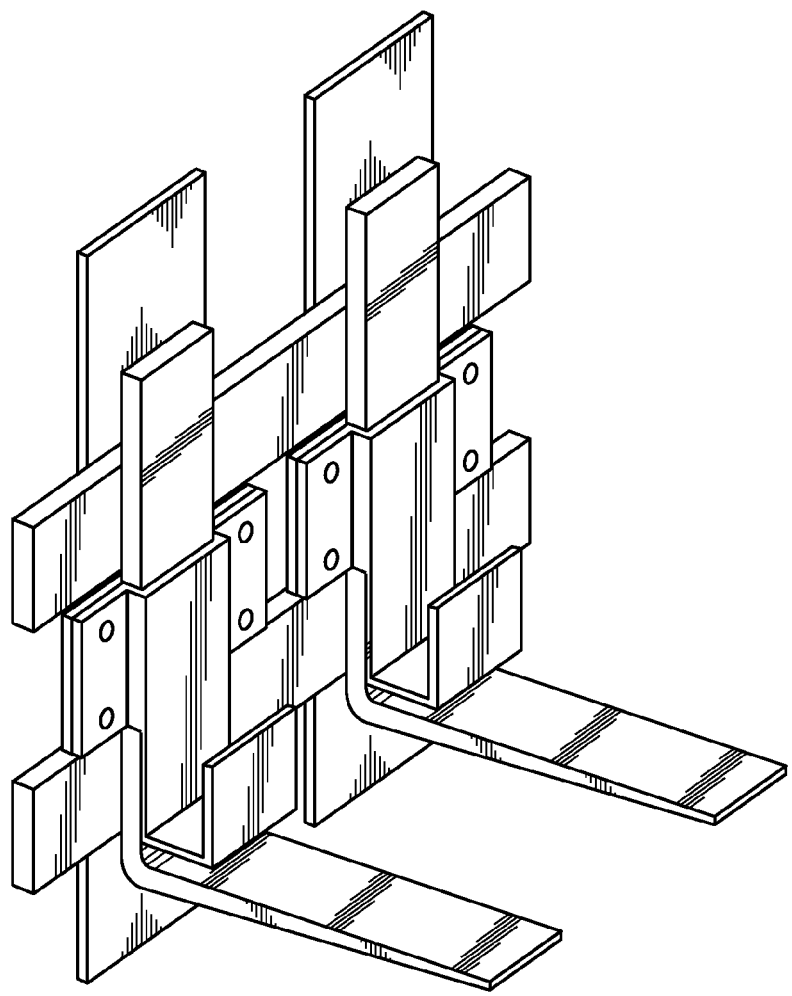
FIG. 6 is a perspective view of a set of forklift blades and the support frame behind them where the blades have been fitted with vertically mounted fittings.

Referring to FIG. 5 and FIG. 6, in addition to mounting fittings on the horizontal portion of the forks, fittings that can accomplish the same task can be mounted on the vertical portion of the forks. Such a fitting is shown in FIG. 5 with a back piece 9 and a front piece 8. A set of fork blades that has been equipped with such fittings is shown in FIG. 6.

Figure 8:
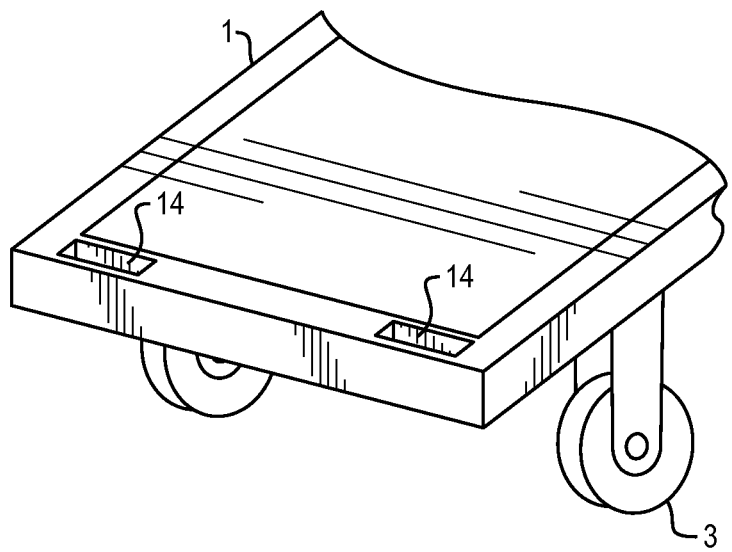
FIG. 8 is a perspective view of two capture slots shown in the end surface of a cart.
Figure 16:
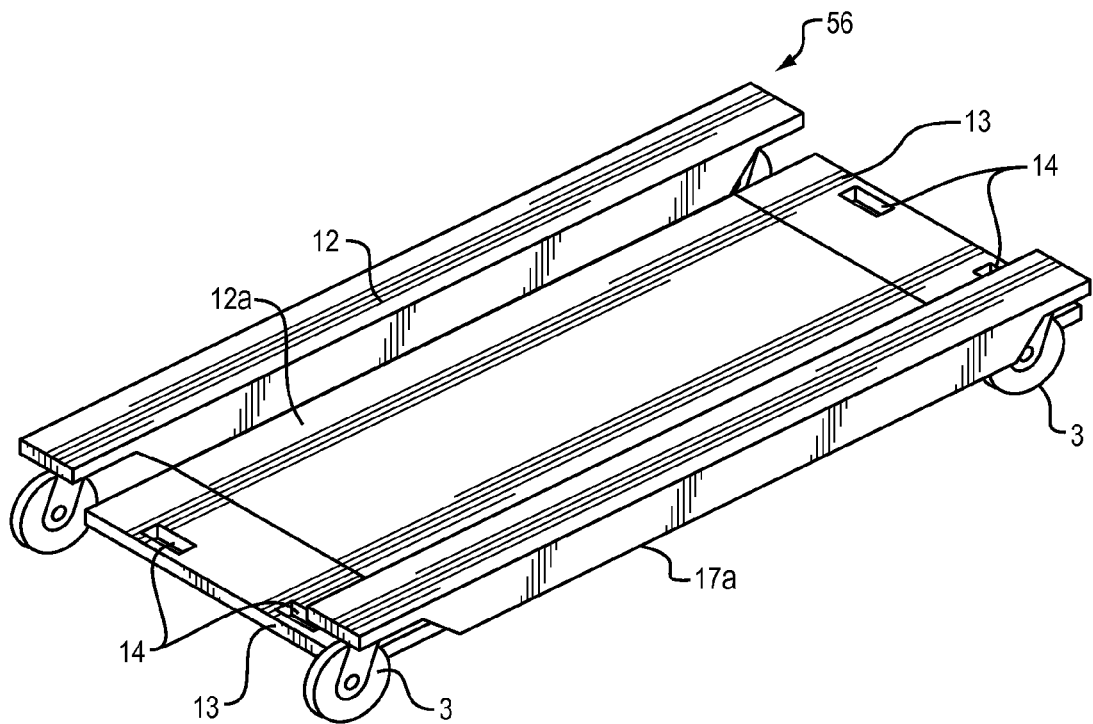
FIG. 16 is a perspective view of a cart that has been designed for end-on loading showing the surface of the cart lowered and provided with spring loaded ramps so that a forklift can drive right up on it from the end to load pallets.

Thus far an upward motion of the forks has been used to secure the cart to the forklift but a downward motion can be used as well. FIG. 10 shows the projections on the underside of the fork blades that can be inserted into capture slots on the cart. FIG. 8 and FIG. 16 show such capture slots (14).

Figure 12:
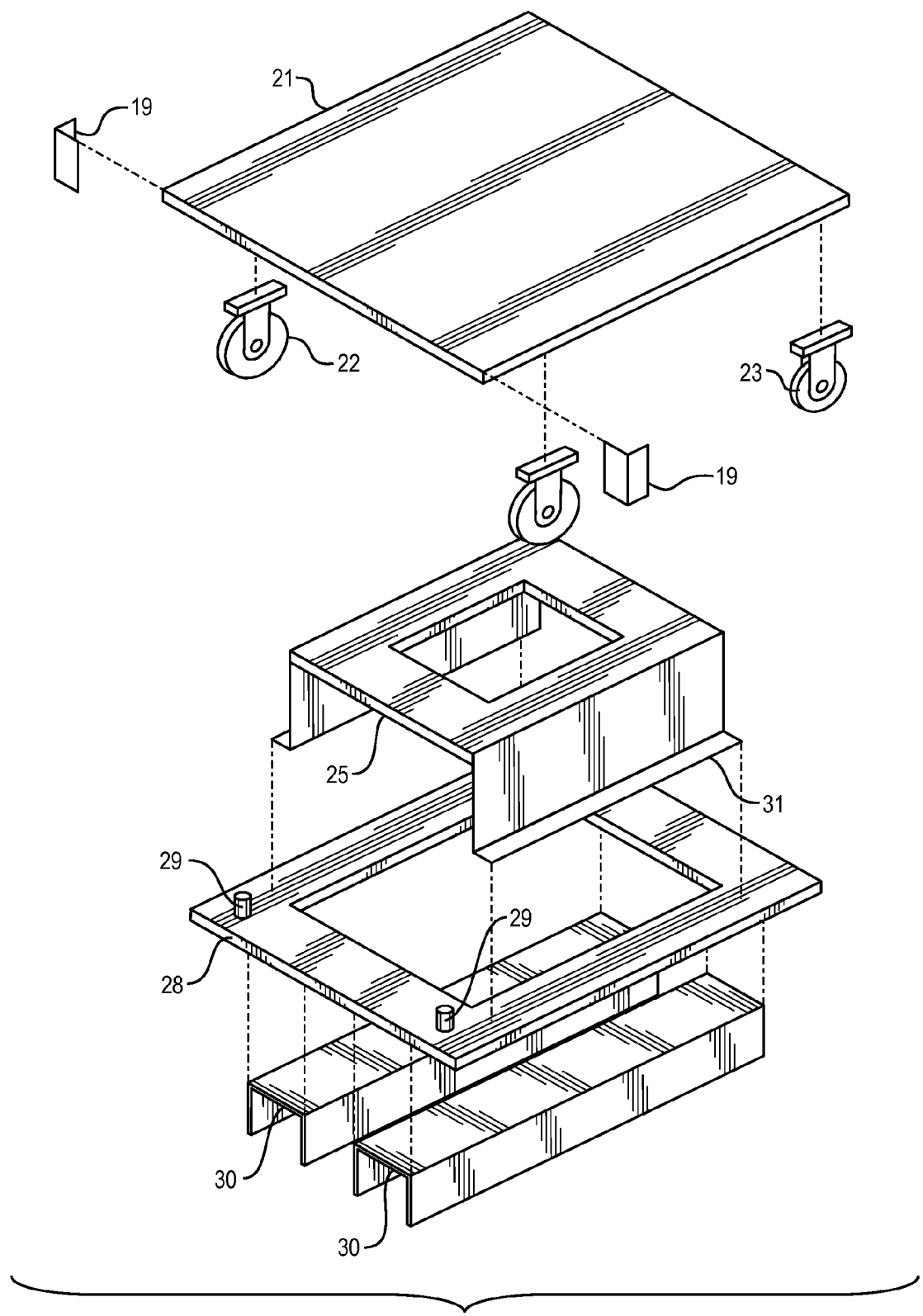
FIG. 12 shows an exploded view of a locking assembly and fork blade slide guides that are secured underneath the moveable platform in FIG. 11.
Figure 13:
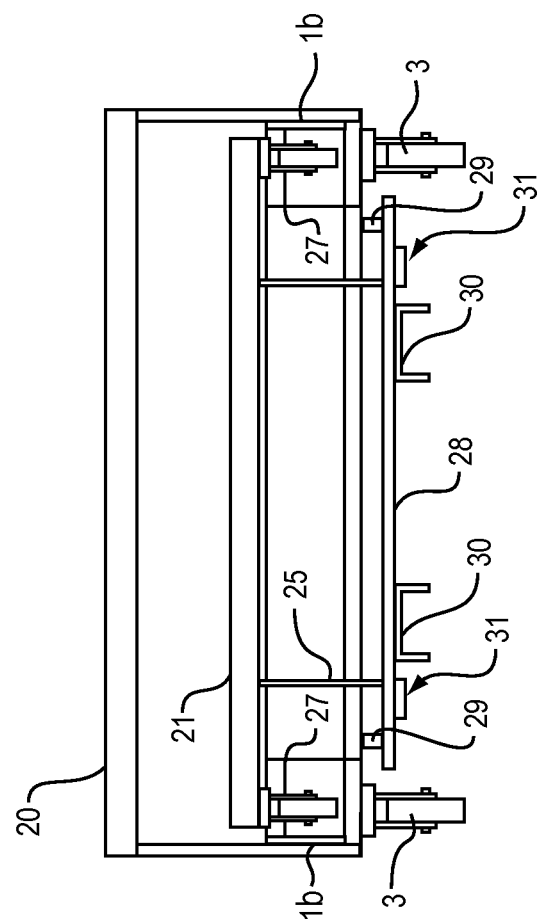
FIG. 13 shows an end on view of just the moveable platform as it would look as it sat on the horizontal flange of the main frame of the cart with the end stop fittings that are mounted to the cart main frame and the catch fittings that are mounted to the moveable platform removed to show the roller wheels of the moveable platform.

Referring to FIG. 12, other means can be used to secure a cart to the forklift 50. FIG. 12 shows a pair of fork guides 30. These are basically inverted troughs. The bottom surface of the trough is covered with a layer of semi-hard rubber. This surface makes firm contact with the top surface of the horizontal portion of the fork when it lifts up to engage the cart. The friction force between the rubber and the fork blade secures the cart in all but the most severe acceleration/deacceleration conditions. The edges of the trough provide support to keep the forks in position when the cart is turned.

Magnetic latching means and suction cups can also be used but these tend to be more expensive than simple mechanical means. They are also more difficult to maintain.

Magnetic latching devices comprise an electromagnet that typically externally has a rectangular cross-section and has one side which is a flat rectangular surface and a flat magnetizable plate mounted on a ball swivel. The material in the plate is of such a nature that it only remains magnetized in the presence of another magnetic field and returns immediately to its de-magnetized state once that field is removed. The electromagnet is kept energized so that when the swivel-mounted plate is brought in contact with the flat surface of the electromagnet the magnetic field of the electromagnet magnetizes the plate thereby securing the plate to the surface of the electromagnet. This device can readily be used as a securing/releasing device in the context of this invention by mounting the swivel plate on the vertical part of the forks of the forklift and by mounting the electromagnet and a power source for it on the cart. Then provide a wireless transmitting device for the forklift operator to use and mount a compatible receiving device with an appropriate output and power source on the cart. As an example of a workable format, the electromagnet would typically be in an energized state so that anytime the forklift operator moves the forks up to it the electromagnet would capture the swivel-mounted plate. To unlatch the forklift from the cart the operator momentarily activates the transmitter. This signal is picked up by the receiver on the cart and is amplified. It activates a timer which operates a relay. When the relay is activated it breaks power to the electromagnet thereby allowing the forklift operator to disconnect from the cart. The timer keeps the relay energized for several seconds or so to give the operator enough time to move the forklift away from the cart. Shortly thereafter the timer times out and the relay is de-energized thereby re-energizing the electromagnet so that it is available for the next latching event.

Also there are suction cup devices that are typically used to lift up sections of flooring that are supported on a framework as part of a raised flooring installation. Such a unit typically comprises two circular suction cups made of a rubbery type material. The suction cups are mounted at either end of a short bar and are oriented perpendicular to the axis of the bar. They also are oriented to face the same planar direction so that a person can grasp the bar in the middle and face both such cups at a flat surface. When the unit is pushed against a flat surface the suction cups deform thereby forcing air out of the collapsed cups. An exit path for the air is provided at the center of the cup where it is mounted to the bar. The air escapes through a one-way valve so that once the cup is collapsed it is kept in place by the partial vacuum inside the cup. To disengage the device from the surface the operator opens another valve that lets air back into the collapsed rubber cups thereby equalizing air pressure inside the cups. It is easy to see how a flat surface could be mounted on the vertical portion of the forks of a forklift and suction cups with the appropriate support equipment would be mounted on the side of the cart. The forklift operator would be provided with a wireless transmitter and the cart would be furnished with a compatible receiver, power source, and control equipment analogous to the equipment provided for using a magnetic latching device as described above.

Cart Design and Methods to Minimize Movement and Maneuvering while Loading Pallets on the Cart There are two basic ways a cart can be loaded by a forklift and coupled to the forklift: (1) from the side and (2) from the end.

Figure 2:
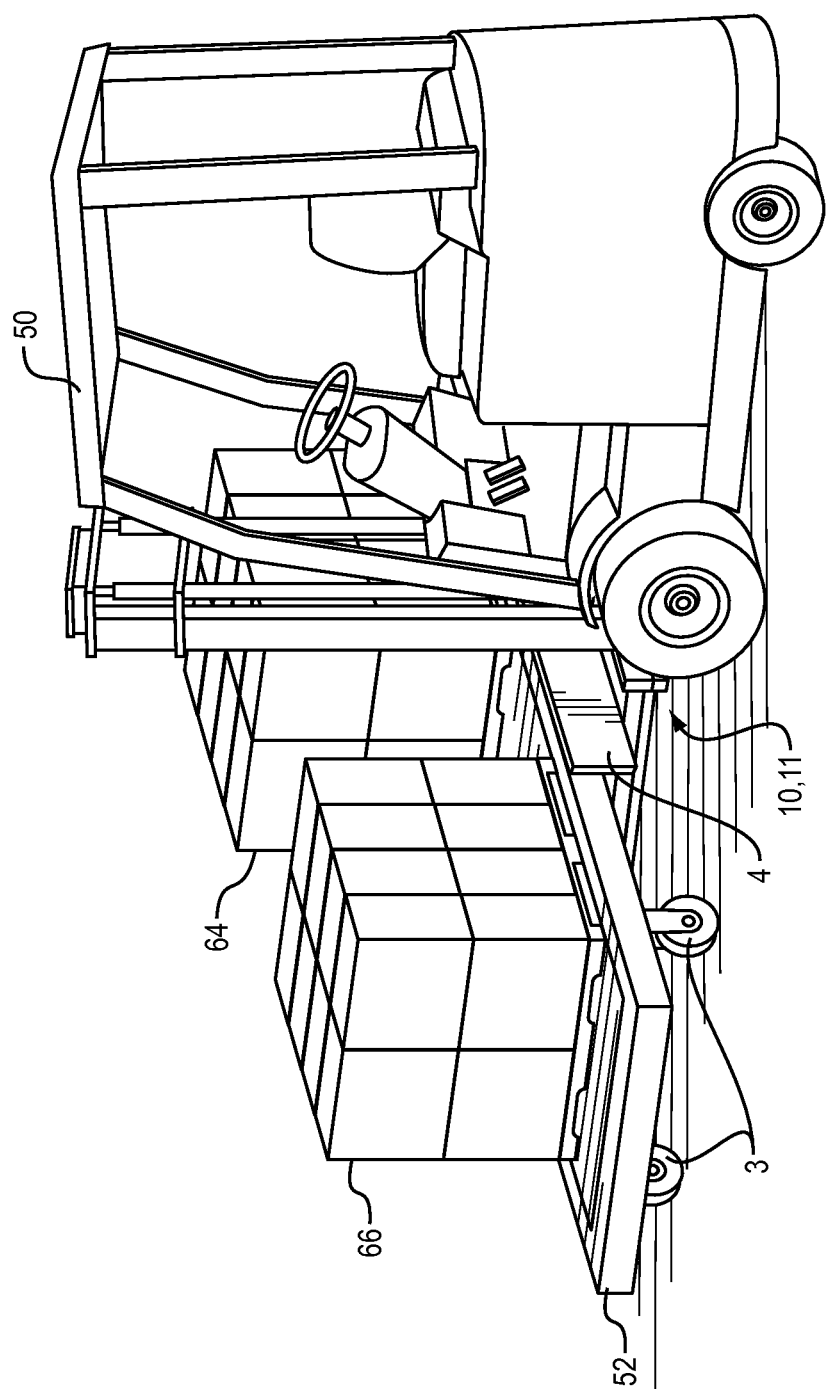
FIG. 2 is a perspective view showing the basic cart loaded with 2 pallets of merchandise and a forklift which is approaching so as to connect to the cart from the side.

The flatbed surface of the cart is rectangular with the long dimension being roughly twice as long as the short dimension. Using the basic interfacing/coupling method described in the previous section, a plate could be fastened to the middle of the long dimension of the cart and the forklift could connect to it there. Furthermore such a plate could be fastened to both sides of the long dimension of the cart. FIG. 2 shows a cart loaded with 2 pallets of merchandise and a forklift is approaching to interface with the cart from the side.

Furthermore if the cart is placed in the vicinity of a trailer that is being unloaded, it can be placed so that the forklift can approach it from the side. The forklift operator simply secures a pallet from the trailer and places it on either the left or the right portion of the cart and then secures another pallet and places it in the remaining open area on the cart. The operator can then couple the forklift to the cart and drive the forklift/cart combination to the appropriate location. Note that in this mode the cart extends several feet past the forklift on both the left and right sides. Also using this mode the cart takes up a relatively wide area behind the trailer. This is a disadvantage if it was desired to place several such carts there and use them to selectively load pallets. Such a process would be much easier if the carts could be placed end-on with respect to the trailer, thereby allowing more alternative slots with less space to take them up.

For a variety of reasons it may be advantageous to load such a cart from the end rather than from the side. If that is the case, then the process becomes more involved than if just a flatbed cart is used.

Approaching the cart from the end the driver can place the pallet on the near end of the cart closest to his direction of approach. That having been done, the driver needs to drive past the other end of the cart and turn around to place the pallet on the far end of the cart. The same need to do extra maneuvering applies if the operator is removing pallets from the cart. If it is desired to place several carts close together on the loading dock for staging purposes, the need to drive to the other end of the carts renders this impractical. Clearly there is an advantage to having some means of placing both pallets on the cart and removing them from the cart while approaching from the same end of the cart. Again there are several ways to do this.

Figure 11:
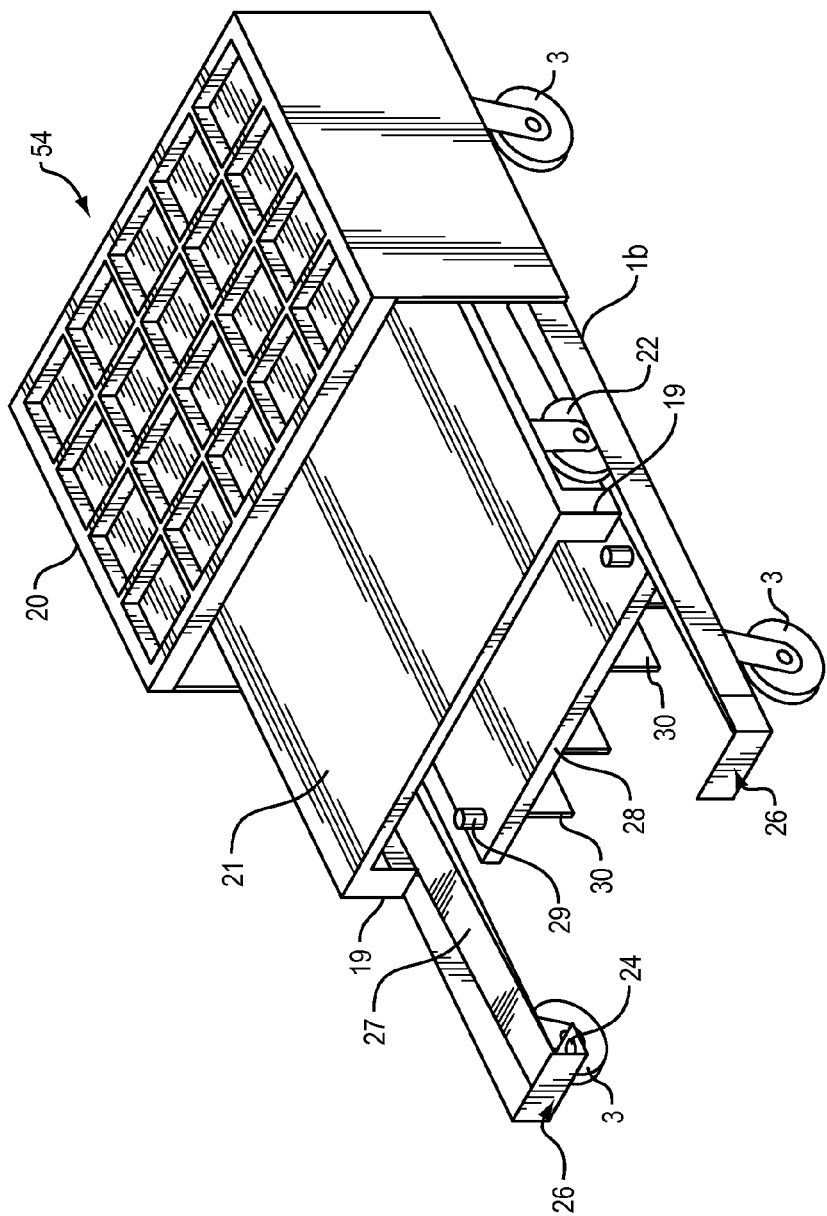
FIG. 11 is a perspective view of a cart designed for end-on loading that has been equipped with a first platform and a second platform that can roll underneath the first platform.
Figure 14:
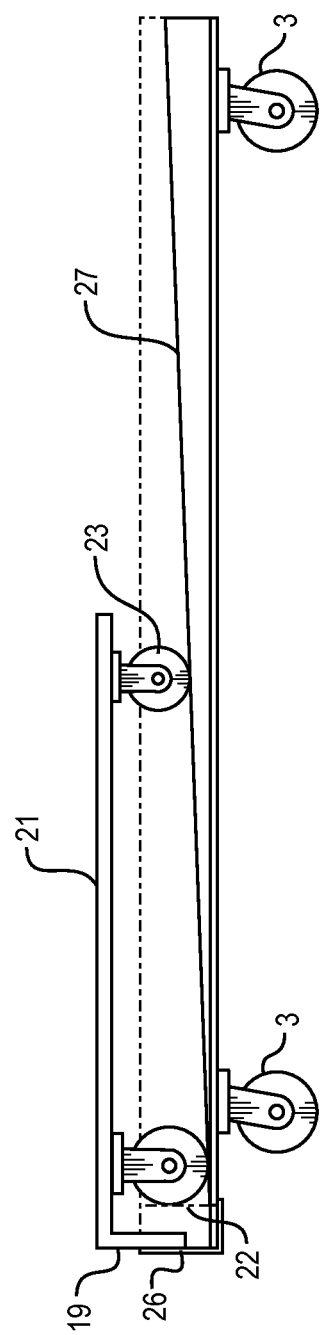
FIG. 14 is a side view of the moveable platform sitting on the cart with the vertical part of the frame cut away to show how the cart sits on the ramp.
Figure 15:
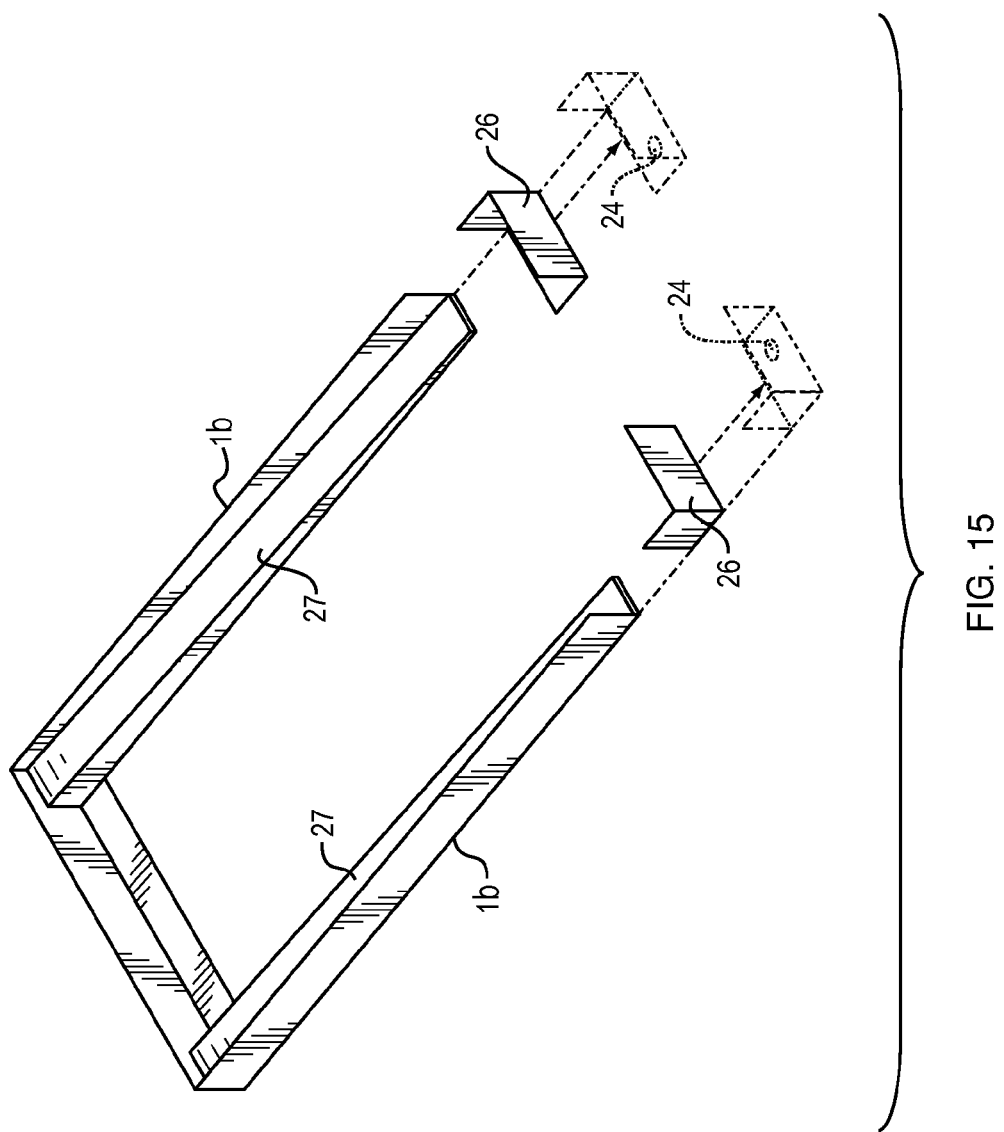
FIG. 15 is a perspective view of just the cart mainframe showing the ramp and the stud locking/insertion hole in the horizontal flange of the cart frame and showing an exploded view of the end stop fittings.

Referring now to FIG. 11, FIG. 11 is a perspective drawing of a cart 54 that is designed to accomplish this. At the far end of the cart 54 is a fixed single pallet support area 20, at the near end of the cart 54 is a moveable single pallet support area 21. The operator approaches from the end which has the moveable area 21. As the forklift 50 moves toward the far end of the cart it pushes the moveable support area 21 backward. That surface is on roller wheels and simply rolls backward. The operator can drive the forklift 50 all the way to the fixed support area 20 at the far end of the cart 54 and place a pallet on it. The moveable support area 21 is completely out of the way, having rolled into an area underneath the fixed support area 20. As the operator backs out of the area bounded on either side by the cart frame, the moveable support area 21 rolls forward on its own. This is accomplished by installing a ramp on the horizontal part of the cart frame that the wheels of the moveable platform 21 rest on. FIG. 15 is a perspective drawing that shows the ramp 27 installed on the cart frame 1b. FIG. 14 shows a side view of just the frame 1b of the cart, the wheels 3, and the moveable support area 21 which has a pair of front roller wheels 22, and a pair of rear roller wheels 23. Also shown is an end-stop 26 which is mounted on the cart frame 1b, and a catch flange 19 which is mounted on the moveable support area 21. These parts prevent the moveable platform 21 from rolling off the end of the cart.

When the forklift operator wishes to connect the forklift to the cart, he simply inserts the forks into the fork guides 30 and lifts the forks several inches. This lifting action inserts the locking studs 29 which are mounted on the locking frame 28 into the stud insertion holes 24 which are in the cart frame 1b. This action freezes the moveable platform so that the forklift operator can drive off with the cart secured via the friction holding the fork blades in place as they are pressed against the surface of the fork guides 30. FIG. 12 is an exploded diagram which shows the parts in the under carriage of the moveable surface 21. A support frame 25 is fastened directly to the underside of the moveable support area 21. The locking frame 28 rests on the support flange 31 of the support frame 25. The fork guides 30 are fastened to the bottom of the locking frame 28.

Another way to achieve end-on loading from a single direction is shown in FIG. 16. This is a perspective drawing which shows a cart 56 having a low-profile surface and frame 12, a drive-on support surface 12a, swivel wheels 3, spring-loaded ramps 13, ramp hinges 13a, and capture slots 14. The forklift operator can access this cart from either direction.

Figure 17:
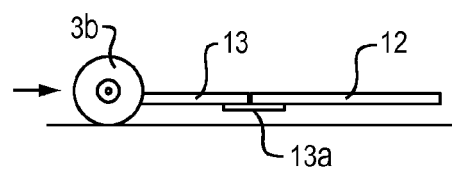
FIG. 17 is a side view of a forklift wheel just making contact with the edge of the spring-loaded ramp.
Figure 18:
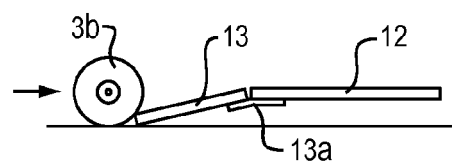
FIG. 18 is a side view of a forklift wheel which (because of its forward rolling motion) has fully depressed the ramp so that its edge is on the ground as the wheel continues up the ramp.

The cart is wide enough to allow the forklift 50 to drive right on the support surface 12a. On each end of the support surface 12a is a spring-loaded ramp 13. The ramps 13 are hinged off of the support surface 12a and ordinarily are parallel to that surface. When the wheel of the forklift hits the end of the ramp it begins to push the ramp toward the ground as shown if FIG. 17. As the forklift wheel continues to roll forward it pushes the ramp all the way to the floor as shown in FIG. 18. The forklift can now continue to move forward and place a pallet of merchandise on the far portion of the cart. The second pallet can readily be placed on the near portion of the cart. To connect the forklift to the cart the operator lowers the forks which are equipped with horizontal mount fittings as shown in FIG. 9 and engages the catch slots 14 which are in the ramp 13.

Figure 19:
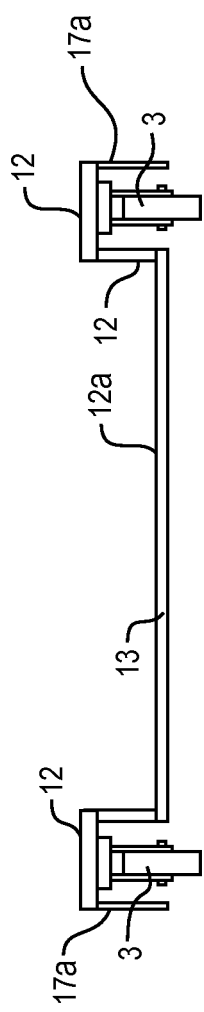
FIG. 19 is an end view of the low profile cart.

FIG. 19 is an end-on view of the low-profile cart showing the frame/surface 12, the wheels 3, and the edge of the ramp 13.

Thus far the carts that have been discussed all are designed to carry two pallets. The question is raised if two pallets, then why not three or four? Theoretically this could be done, but then the length and width of the resulting forklift/cart assembly would tend to become awkward and cumbersome and would certainly slowdown the speed at which the forklift driver could proceed. Consideration has to be given to the overall length of the assembly and how that affects making a turn into a warehouse storage rack aisle. Also consideration has to be given to access and maneuverability that the forklift would have to the pallets when in a storage rack aisle if the cart were carrying three or four pallets. Two is considered to be the ideal number for this process. In terms of considering the number of pallets carried by a cart, the count is determined by the number of pallets placed side-by-side on the cart. Additional pallets could be stacked on top of the pallets placed directly on the support surfaces of the cart. This of course is at the discretion of the user.

Figure 20A:
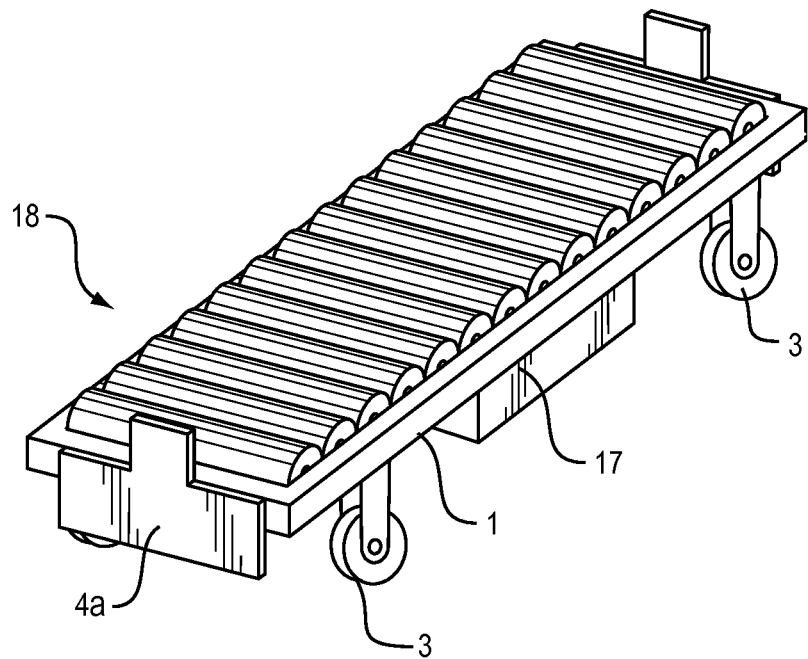
FIG. 20A shows a roller-conveyor type cart.
Figure 20B:
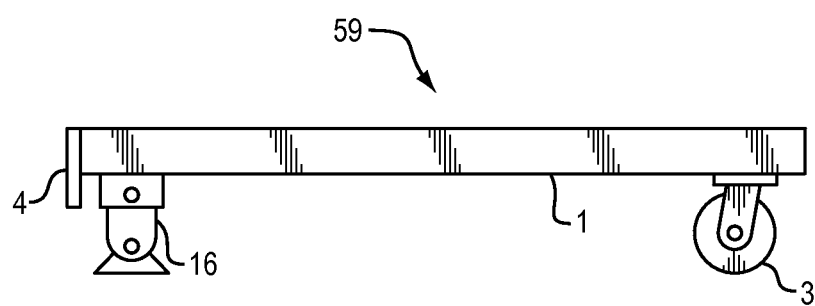
FIG. 20B shows a trailer-style cart with a support stand on one end and swivel wheels on the other end.

Referring now to FIG. 20B, thus far when it comes to moveable devices, four-wheeled carts are the only type of device that has been discussed. However, as shown in FIG. 20B a flat rectangular support surface that has a pair of wheels 3 at one end and a support stand 16 at the other end (i.e. a trailer) is also a useable device. Because the forklift has to physically lift the end with the stand 16 off the ground, there is the possibility that the combined weight of the pallets and/or their weight distribution on the cart would exceed the lifting/tipping capacity of the forklift. Four wheels simply eliminate this issue. But a trailer-style device would be useable for a lot of situations. Such a trailer 59 is shown in FIG. 20B.

We can use the generic term surface transport device or transport device to include both carts (units that have only wheels for support) and trailers (units that have a support stand at one end and wheels at the other end).

Regarding the subject of carts 54, 56, and 58 that are loaded from the end, an initial idea was to make the cart surface a roller-conveyor. An operator would load a pallet on the near end of the cart and the roller-conveyor would move the pallet to the far end of the cart thereby clearing the way for the forklift operator to place a second pallet on the near end of the cart. The operator would do so and then engage the forklift with the cart and proceed. When the operator removes the pallet on the near end of the cart, the roller-conveyor would activate and roll the pallet at the far end to the near end so the operator could access it from that end. This particular approach has a higher expense of roller-conveyor equipment compared to other methods such as the cart 54 shown in FIG. 11. A perspective view of the roller-conveyor cart 18 having a modified coupling plate 4a is shown in FIG. 20A.

Referring to FIG. 20A, in order to achieve the automatic aspects of the roller-conveyor cart 18 one simply needs to place sensors in the vicinity of each end of the cart so that the presence of a pallet there can be detected. The cart 18 is designed so that the operator may load it from either end and unload it from either end. When the cart is empty the sensors near both ends report no output. When the first pallet is placed on either end of the cart the sensor there detects it and then via logic gates and memory circuits produces an output which is appropriately amplified to then activate motorized equipment thereby moving the pallet of merchandise to the other end of the cart. Once there the sensors detect the palletized load, and the movement of the pallet is stopped. The roller-conveyor assembly is designed so that the inertia of the motor and drive mechanism freezes the rotation of the rollers unless the motor is activated. The operator then loads the second pallet on the nearside of his approach cart and engages the forklift to the cart and proceeds to his drop-off location. When it is time to unload the cart, the operator comes to a stop and disengages from the cart and removes the nearside pallet or the far-side pallet (if he chooses). The sensors detect the removal of the pallet and sending the signal through the network of logic gates, memory circuits, and amplifier circuitry the motor is actuated in the proper direction so as to move the remaining pallet to the empty space produced by the removal of the first pallet. When that pallet gets there the sensors detect it and turn the drive motor off. Whether at this location or a second drop-off location the operator eventually removes the remaining pallet from the cart and both sensors detect no pallets present on the cart. Additional controls can be provided so that the operator can turn the automatic circuitry off and back on or send a signal to manually instruct the system to reposition a pallet from one end of the cart to the other. FIG. 20A shows an enclosure for power source and control devices 17. The logic gates, memory circuits, amplifiers, relays, and motors, etc. are housed in this enclosure. The specific circuit design is readily known to one of ordinary skill in that art and the construction and successful operation of circuits of this type has been well-established.

Figure 21:
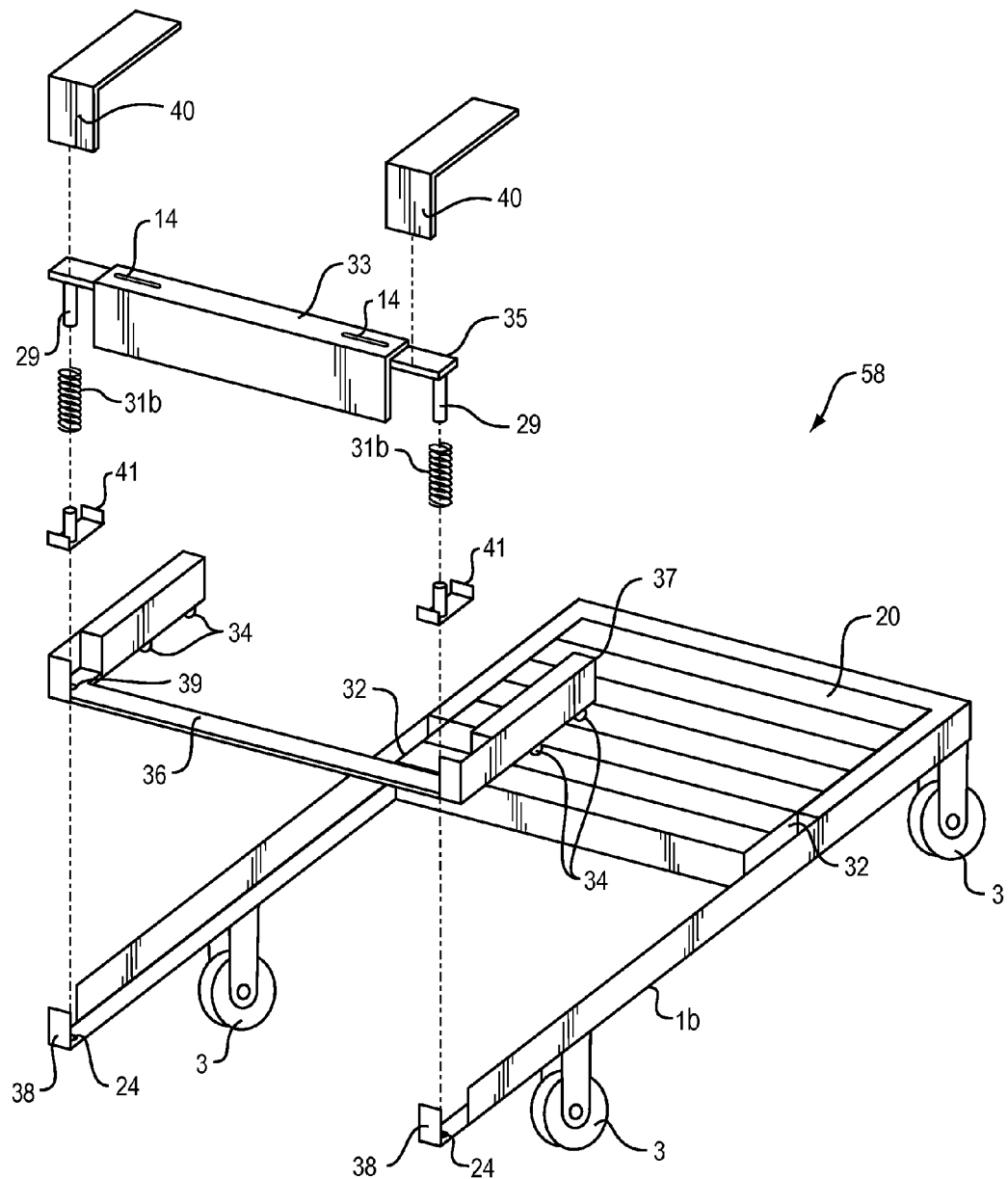
FIG. 21 is an exploded diagram of a cart which uses a moveable bar and a downward motion by the forklift to engage the cart.

Referring again to FIG. 11 and FIG. 21, the cart 54 shown in FIG. 11 requires an upward movement of the forks to engage the forklift to the cart. A modification of that embodiment is shown in FIG. 21. In this cart 58 the moveable surface is replaced with a moveable frame 36. The moveable frame 36 is U-shaped and has a set of roller wheels 34 and a roller wheel housing 37 on each side that form the vertical sides of the U. The frame 36 also has a pass-through hole 39 in each corner of the U-shape. A locking bar 35 rests in the area above the horizontal part of the U when the unit is assembled. The locking bar itself has a locking stud 29 near each end, two capture slots 14, and a covering surface 33. A fitting called a tubular stud guide and mounting surface with end flanges 41 is inserted in the rectangular area around the pass-through hole 39. This is a single piece with a hole 43 in the flat surface portion where the tube 42 is attached. The hole 43 is the same diameter as the inside diameter of the tube 42 so that the stud 29 can pass through. The hole 43 is positioned so that the tube 42 lines up with the stud 29 when the fitting 41 is inserted in the area around the pass-through hole 39. The flat surface of the fitting 41 also has flanges at 90 degrees to its surface at each end to ensure that the fitting does not dislodge from shearing and torsional forces when the forklift is engaged with the cart 58 and is pushing or pulling it. The length of the tube 42 is less than ½ the length of the stud 29 but long enough to serve as an effective guide for the stud 29. The inside diameter of the tube 42 is just slightly larger than the outside diameter of the stud 29. When fitting 41 is inserted in the area around the hole 39 the tubular portion is secured by the contact that the mounting surface and flanges of the fitting 41 are making with the rest of the frame. This in-turn stabilizes the stud 29 from both translational shifting in the horizontal plane and torsional shifting thereby allowing only up and down movement of the stud 29. A support spring 31b whose inside diameter is slightly larger than the outside diameter of the tubular portion of the fitting 41 is slid over the tubular portions of each of the fittings. This keeps the locking bar 35 in a raised position so that the locking studs 29 do not drop through the pass-through holes 39. Finally a retainer cover 40 is secured to the top of the roller wheel housing 37 on each side and the front vertical surface at the corners of the locking bar 35 itself. The retainer cover 40 keeps the locking bar 35 from popping out of the area it is seated in above the moveable frame 36. The moveable frame 36 rests on the frame 1b of the cart 58 itself. The cart 58 has a stationary single-pallet surface 20, a stud insertion hole 24 near the end of the frame on each side, and an end stop flange 38 at the open end of the frame 1*b* on each side.

When a forklift approaches the cart 58 from the end with the moveable frame 36, it can carry a pallet directly to the surface 20 at the far end of the cart 58 because the moveable frame 36 rolls back toward surface 20. Note that there are clearance slots 32 on either side of the single-pallet surface 20 so that the U-shaped moveable frame 36 can be pushed all the way to the edge of the single-pallet support surface 20. When the forklift places a pallet on the surface 20 and backs up, the moveable frame 36 automatically returns to its position at the near end of the cart frame 1*b*. It can do this because the roller wheel housing 37 contains a spring-based wind-up mechanism that stores energy as spring tension via the rotation of the roller wheels 34 as the moveable frame 36 is pushed toward the support surface 20 by the forklift. As the forklift 50 backs up the spring mechanism unwinds and it pushes the moveable frame back to its original position. When the forklift obtains a second pallet, it simply drives up to the moveable frame 36 with the forks high enough to clear the frame and position the horizontal fittings 10/11 above the capture slots 14 on the locking bar 35. The operator then lowers the forks several inches. This inserts the fittings 10/11 into the capture slots 14 and depresses the locking bar 35. As the locking bar moves downward it compresses the support springs 31*b* and the locking studs 29 move through the pass-through holes 39 and also through the stud insertion holes 24 in the frame 1*b* of the cart itself. That action locks the moveable frame 36 in position and the forklift operator can drive away with the cart firmly secured to the forklift 50. Note that the forklift operator did not have to perform a separate movement to place the pallet on a surface and then engage the forklift to the cart. This embodiment eliminates that step. In order to disengage from the cart 58, the forklift operator simply raises the forks several inches. When carts such as the cart 54 with fixed and movable support areas, the low profile ramp cart 56, and the moveable frame cart 58 are used, they will be equipped with fail-safe braking systems which means that the braking system will be engaged unless the forklift is coupled to the cart. This ensures that the cart 54, 56, 58 will remain stationary when any of their moving parts are contacted and moved by the forklift. Furthermore, the other cart styles and the trailer unit 59 will also be equipped with the same type of braking system and they will be rendered stationary also.

Figure 22A:
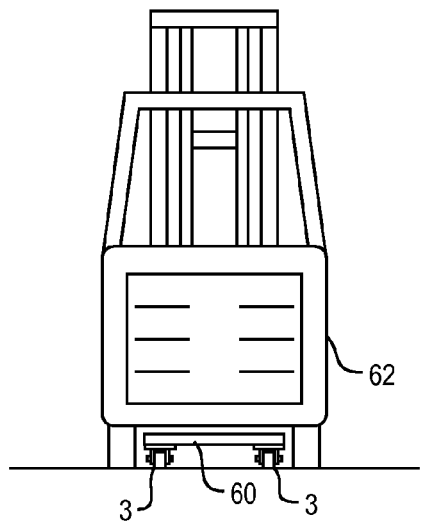
FIG. 22A is a rear view of a forklift with a low-profile surface transport unit underneath of it, the forklift having sufficient undercarriage clearance to drive directly over top of it.
Figure 22B:
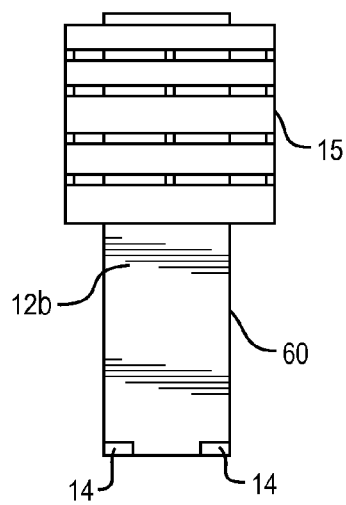
FIG. 22B is a top view of the low-profile/narrow width surface transport unit.
Figure 22C:
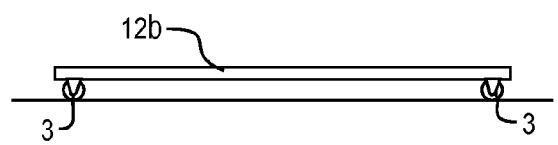
FIG. 22C is a side view of the low-profile/narrow width surface transport unit.

Another way in which a cart can be designed to allow a forklift 62 having a higher undercarriage to access the far end of the cart while approaching from the opposite end is to make the cart 60 narrow enough so that the forklift 62 can drive over the cart 60 while the forklift wheels stay on the ground. The undercarriage of the forklift 62 has to be high enough and the cart 60 low enough for this to work. The undercarriage height varies significantly between forklifts so a necessary condition for this approach to work is to provide a forklift 62 with sufficient clearance between its undercarriage and the cart 60 on the floor of the warehouse. Such a cart 60 is shown in FIG. 22A. The cart 60 is shown with a forklift 62 parked over top of it. A top view of the cart 60 is shown in FIG. 22B. An empty pallet 15 is shown on the far end of the cart to illustrate how the cart 60 would carry pallets of merchandise. The cart has a low-profile/narrow width support area 12*b*, swivel wheels 3, and capture slots 14. To place pallets on the cart the operator simply drives over the cart 60 with a pallet of merchandise on the forks and places the pallet 15 on the far end of the cart support area surface 12*b*. The forklift operator simply backs up to clear the cart 60, obtains a second pallet of merchandise, and places it on the cart 60. The operator can then lower the forks and engage the fittings 10/11 on the forklift with the capture slots 14 to move the cart 60 loaded with one or two pallets. FIG. 22C shows a side view of the same cart 60.

This invention has been disclosed in terms of a preferred embodiment and alternate embodiments. It will be apparent that many modifications can be made to the disclosed embodiments without departing from the invention. Therefore, it is the intent of the appended claims to cover all such variations and modifications as come within the true spirit and scope of this invention.

What is claimed is:

1. A method of transporting a plurality of pallets using a forklift, including a three wheel or four wheel counterbalanced sitdown rider type forklift with an overall length of approximately 10.5 feet, from a receiving location to at least a first location and a second location within an array of storage racks in a warehouse having approximately twelve feet wide aisles, each of said first and second locations having a plurality of storage levels, comprising the steps of:

(a) providing a cart having a structure capable of supporting and transporting pallets loaded with merchandise, said cart having at least two swivel wheels, and a capacity to transport at least two of said plurality of pallets, each of said pallets measuring approximately 48 inches by 40 inches;

(b) providing on said cart at least one coupling means for enabling said forklift to connect to said cart for moving said cart, said coupling means having a configuration to enable said forklift to place said pallets on said cart and remove said pallets from said cart from either end and either side of said cart within said approximately twelve feet wide aisles regardless of said end or said side location of said coupling means on said cart;

(c) extracting with said forklift a first of said plurality of pallets of merchandise from said receiving location and placing said first pallet on said cart via either end of said cart when said coupling means, that is being used to transport said cart down an aisle, is located on an end of said cart or via either side of said cart when said coupling means, that is being used to transport said cart down an aisle, is located on a side of said cart in order to enable removing said pallets from said cart within said aisles of limited width with said forklift;

(d) extracting with said forklift a second of said plurality of pallets of merchandise from said receiving location and placing said second pallet on said cart via the remaining open end of said cart after said first pallet was placed on said cart via either end of said cart or via either side of said cart after said first pallet was placed on said cart via either side of said cart in order to enable removing said pallets from said cart within said aisles of limited width with said forklift;

(e) coupling said forklift to said cart via either end of said cart when said coupling means, that is being used to transport said cart down an aisle, is located on an end of said cart or via either side of said cart when said coupling means, that is being used to transport said cart down an aisle, is located on a side of said cart in order to enable removing said pallets from said cart within said aisles of limited width with said forklift;

(f) driving said forklift to said first location and decoupling said forklift from said cart;

(g) removing one of said pallets from said cart with said forklift and placing said pallet in said first location at a predetermined storage level;

(h) re-coupling said forklift to said cart via either end of said cart when said coupling means, that is being used to transport said cart down an aisle, is located on an end of said cart or via either side of said cart when said coupling means, that is being used to transport said cart down an aisle, is located on a side of said cart in order to enable removing said pallets from said cart within said aisles of limited width with said forklift;

(i) driving said forklift to said second location and decoupling said forklift from said cart; and (j) removing said second pallet from said cart with said forklift and placing said second pallet in said second location at a predetermined storage level.

2. The method as recited in claim 1 wherein said method comprises the steps of repeating steps (c) to (j) for transporting additional pallets of said plurality of pallets at said receiving location to other storage locations at a predetermined storage level.

3. A method of transporting a plurality of pallets of merchandise using a forklift, including a three wheel or four wheel counterbalanced sitdown rider type forklift with an overall length of approximately 10.5 feet, from an array of storage racks in a warehouse separated by approximately twelve feet wide aisles where said pallets are stored on said racks at a plurality of levels, to a service location in an area adjacent to said array of storage racks, comprising the steps of:

(a) providing a cart having a structure capable of supporting and transporting pallets loaded with merchandise, said cart having at least two swivel wheels and capacity to transport at least two of said plurality of pallets, each of said pallets measuring approximately 48 inches by 40 inches;

(b) providing on said cart at least one coupling means for enabling said forklift to connect to said cart for moving said cart, said coupling means having a configuration to enable said forklift to place said pallets on said cart and remove said pallets from said cart from either end and either side of said cart within said approximately twelve feet wide aisles regardless of said end or said side location of said coupling means on said cart;

(c) coupling said forklift to said cart having at least one coupling means provided on said cart for receiving blades of said forklift, said coupling means being on either side or either end of said cart, and driving said cart to a first location within said array of storage racks and aisles;

(d) decoupling said forklift from said cart;

(e) removing with said forklift said first pallet from a predetermined storage rack at a predetermined level and placing said first pallet on said cart via either end of said cart when said coupling means that has been selected is located on an end of said cart or via either side of said cart when said coupling means that has been selected is located on a side of said cart in order to enable placing said pallets on said cart with said forklift within said aisles of limited width of said warehouse;

(f) re-coupling said forklift to said cart having at least one coupling means provided on said cart for receiving blades of said forklift, said coupling means being on either side or either end of said cart, and driving said cart to a second location of a second pallet to be loaded on said cart wherein said second location is within said array of storage racks and aisles;

(g) decoupling said forklift from said cart;

(h) removing said second pallet from a predetermined storage rack at a predetermined level at said second location and placing said second pallet on said cart via the remaining open end of said cart when said coupling means that has been selected is located at an end of said cart or via a side of said cart when said coupling means that has been selected is located on a side of said cart in order to enable placing said pallets on said cart with said forklift within said aisles of limited width of said warehouse;

(i) re-coupling said forklift to said cart having at least one coupling means provided on said cart for receiving blades of said forklift, said coupling means being on either side or either end of said cart and driving said cart to said service location, said service location being an area adjacent to said array of storage racks and aisles;

(j) decoupling said forklift from said cart; and (k) removing said first pallet and said second pallet with said forklift from said cart and placing said first pallet and said second pallet at said service location.

4. The method as recited in claim 3 wherein said method comprises the steps of repeating steps (c) to (k) until a predetermined number of said plurality of pallets are transported from said predetermined storage racks to said service location.

\* \* \* \* \*